United States Patent [19]

Carter

[11] Patent Number: 4,958,870
[45] Date of Patent: Sep. 25, 1990

[54] COMBINATION BUMPER AND TIRE STORAGE COMPARTMENT WITH TIRE LOCK MECHANISM

[76] Inventor: Bernie Carter, 7123 Thrush View #30, San Antonio, Tex. 78209

[21] Appl. No.: 419,145

[22] Filed: Oct. 10, 1989

Related U.S. Application Data

[63] Continuation-in-part of Ser. No. 251,307, Sep. 30, 1988, Pat. No. 4,896,910.

[51] Int. Cl.⁵ .............................................. B62D 43/00
[52] U.S. Cl. ..................... 293/106; 293/117; 296/37.2; 224/42.06; 224/42.25
[58] Field of Search ............... 293/106, 102, 126, 136, 293/149, 155; 296/37.2; 224/42.06, 42.24, 42.25, 42.13, 42.28; 280/152.05

[56] References Cited
U.S. PATENT DOCUMENTS

| | | | |
|---|---|---|---|
| 1,399,379 | 12/1921 | Currier | 224/42.25 |
| 1,931,080 | 10/1933 | Nehls | 224/42.24 |
| 3,618,835 | 11/1971 | Terry | 224/42.06 |
| 3,698,609 | 10/1972 | Lund | 224/42.06 |
| 4,486,910 | 1/1990 | Carter | 293/106 |

Primary Examiner—Robert P. Olszewski
Assistant Examiner—Mark T. Le
Attorney, Agent, or Firm—Kenneth H. Johnson

[57] ABSTRACT

A step bumper having a hinged door as the step, such door being of sufficient width and height to accommodate and secure a spare tire through. Two attachment extensions are provided for securing the bumper to the main frame members of the vehicle. Support structures are provided in the form of two steel straps attached by one end to a cross member on the underside of the vehicle and to the bumper attachment extensions at the opposite end. The straps are shaped to conform to the shape of a spare tire. The step is hinged to the extensions and releasably held closed by hand operated knob bolts, which extend through holes in each side of the step into corresponding threaded holes, e.g., nuts welded on to the extensions. The tire securing mechanism has an arcuate shape with a reverse hook at one end and a loop structure at the opposite end. The reverse hook fits in a hole in the wheel of the tire, the arcuate shape goes around the tire and the loop is locked to a chain which is affixed to the cross member.

7 Claims, 1 Drawing Sheet

COMBINATION BUMPER AND TIRE STORAGE COMPARTMENT WITH TIRE LOCK MECHANISM

BACKGROUND OF THE INVENTION

This application is a continuation in part of U.S. patent application Ser. No. 07/251,307 filed Sept. 30, 1988, now U.S. Pat. No. 4,896,910.

Field of the Invention

The present invention relates to a tire storage compartment, particularly for pick-up trucks and other vehicles wherein the spare tire storage is below the frame of the vehicle.

Related Art

Several types of vehicles provide for storage of the spare tire underneath the vehicle near the rear. Most common among these are light pick-up trucks and station wagons. Access to the spare tire so located can be difficult and time consuming. For instance, removing the spare tire may require that the operator or mechanic physically crawl under the vehicle and manipulate the retention mechanism and wrestle the spare tire from under the vehicle. Replacement of the tire is just as time consuming and arduous. Some people prefer to take the vehicle to a service station or garage which has a lift in order to facilitate the removal and replacement of the spare tire. However, tires do not conveniently go flat in or near such establishments, leaving the operator no choice at least as to the removal of the spare. In such cases, due to the difficulty of replacement of the tire, it is commonly tossed into the freight compartment of the vehicle taking up useful space and exposing the tire (and wheel) to the risk of theft.

Pick-up trucks especially may be ordered with "custom" rear bumpers which are desirable as much for appearance as well as particular functions. Such bumpers may be ordered from and attached by the dealer or may be bought and installed by the owner. Particularly popular are "step" bumpers which have a cut out or step in the center portion of the bumper to allow easy access over the tailgate of a pick-up truck. Often these "step" bumpers include one or more apertures in the step for installation of towing "balls". In such cases, the bumpers must be of sufficient strength and be attached securely in order to support both the "tongue" and "towing" weight of the trailer or other towed apparatus.

Attachment of such a bumper to the vehicle frame is rather simple. Several bolt holes are provided in the two main longitudinal vehicle frame members. The bumper is provided with extensions which align with the frame and bolt holes allowing the bumper to be secured to the frame with suitably sized bolts and nuts.

The inventor hereof thus conceived of a simply installed combination bumper and tire storage compartment which allows easy access to the spare tire and at the same time provides for a decorative and useful bumper. Additionally, a security device is provided to secure the spare tire within the storage compartment.

SUMMARY OF THE INVENTION

Briefly, the present invention provides a step bumper having a hinged door as the step, such door being of sufficient width and height to accommodate a spare tire. Two attachment extensions are provided for securing the bumper to the main frame members of the vehicle. Support means are provided in the form of two steel straps attachable by one end to a cross member on the underside of the vehicle and to the bumper attachment extensions at the opposite end. The straps are shaped to conform to the shape of a spare tire and may be angled slightly downward toward the front of the vehicle to securely support the tire underneath the rear of the vehicle. Finally, a securing mechanism is provided one end having a handle and curving over the spare tire with the other end hooked through an aperture (e.g., brake vent or lug nut hole) in the wheel of the spare tire. A short length of chain is provided to lock the handle down in such a position that the securing mechanism cannot be lifted and unhooked from the wheel.

DESCRIPTION OF THE PREFERRED EMBODIMENT

Figure 1:
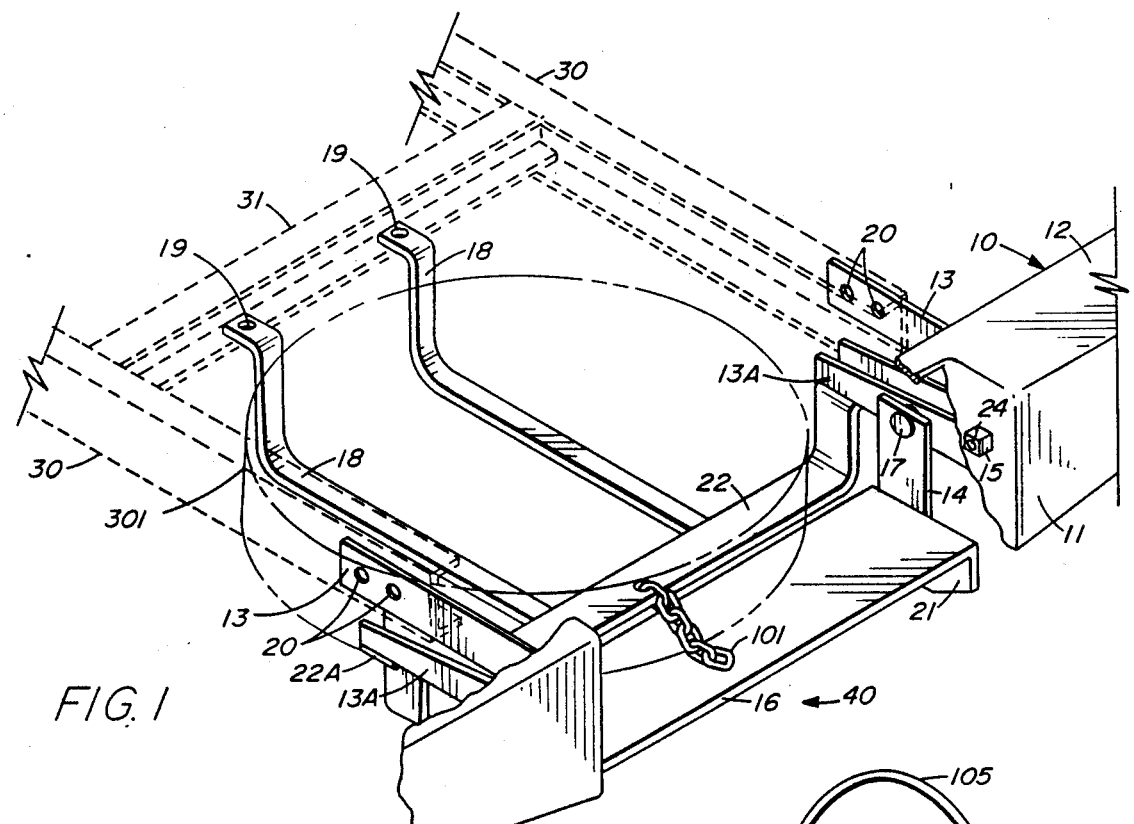
FIG. 1 is a perspective of the bumper with the access door open and showing the support straps of the invention.

Referring now to the figures in which like components are given like reference numerals, a description of the preferred embodiment of the invention is shown.

Figure 2:
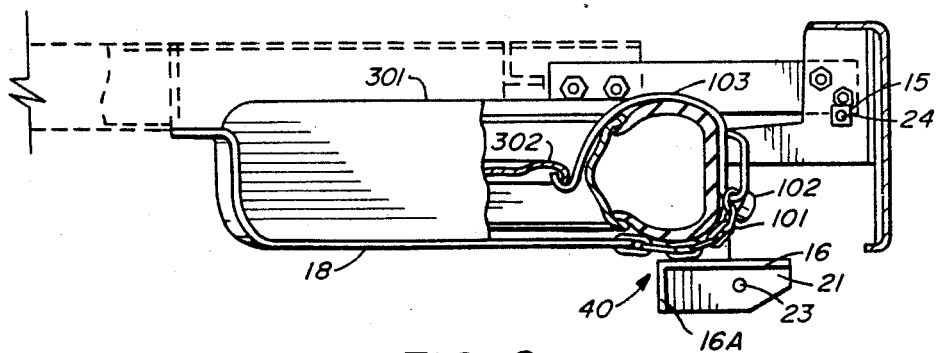
FIG. 2 is side elevational view of the invention.

Referring first to FIGS. 1 and 2, the components of the preferred embodiments are shown. The figures show a partial view of the bumper which is generally shown at 10. The bumper 10 includes a top surface 12 and rear surface 11, the rear surface 11 is shown facing away from the rear of the vehicle to which the bumper is attached. The bumper 10 is attached to the vehicle by extensions 13 which may be welded or otherwise attached to the inside of rear face 11 and thence to the main frame members 30 by bolts which are passed through bolt holes 20 on the extensions 13.

Support means for the spare tire are shown as steel straps 18 which are contoured and shaped to fit a spare tire at the end facing the front of the vehicle. The straps 18 are attachable at the front ends by bolts (not shown) through bolt holes 19 to vehicle frame cross member 31, and are attached, as by welding, to cross bar 22 at the opposite end. The cross bar 22 is in the form of a U with flanges 22a extending outward from the top of the U. The cross bar 22 is attached to extensions 13a by bolts (not shown) through the flanges 22a with extensions 13a being welded or otherwise attached to bumper 10. Together, the straps 18 and the cross bar 22 create a storage space into which a spare tire may be placed and supported.

Door means, generally indicated at 40, is provided in the bumper 10 immediately adjacent to the storage space created by the straps 18 and cross bar 22. The door means comprises a rectangular box like structure open at the rear and top and having side members 21, front member (facing the rear of the vehicle) 16 and bottom member 16a, and also includes hinge members 14 which are attached, as by welding, to side members 21. Hinge pins 17 are connected through hinge members 14 and extensions 13a. Since the door may be expected to be part of a towing assembly, the hinge members are provided with hinge pins 17 capable of withstanding the stresses associated with towing. As shown in both FIG.

1 and FIG. 2 the door is in the open or lowered position. To retain the door in the up or closed position, holes 23 are provided in side members 21 which are alignable with nuts 15 welded onto extensions 13, the nuts having internal threads 24. A pin having external thread on one end (not shown) is passed through holes 23 and the external threads are engaged with internal threads 24 to retain the door in the closed position. A chain 101 is attached to cross bar 22, the purpose of which will become apparent.

Figure 3:
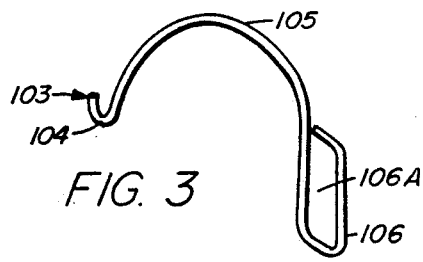
FIG. 3 is a side elevational view of the locking mechanism of the present invention.

Looking now at FIG. 3 the locking mechanism is shown generally at 103. The locking mechanism may be fashioned out of a single steel rod if desired, and is shown to have a handle opening 106a formed by loop 106 on one end. The locking mechanism continues from loop 106 up in an arcuate shape 105 which generally conforms to the shape of a cross section of a tire. The locking mechanism terminates at the other end in a reverse hook 104.

Referring again to FIG. 2 the use of the locking mechanism is illustrated. Reverse hook 104 is placed through a brake vent aperture opening in spare tire wheel 302 and arcuate section 105 pulled down over the tire with loop 106 extending downward toward cross bar 22. Chain 101 is secured to loop 106 by a pad lock 102 such that the locking mechanism cannot be lifted to release reverse hook 104. The spare tire 301 is thus secured within the compartment.

While the specific embodiment shown is fitted onto a pick-up truck, the invention with minor modifications may be adapted to fit on any vehicle which carries the spare tire on the underside.

The invention claimed is:

1. A combination vehicle bumper and tire storage compartment with tire lock comprising:
   (a) a U shaped cross bar attachable main frame members of said vehicle near the rear of said vehicle;
   (b) at least two straps attached by one end to said cross bar and attachable at the other end to a cross member of the frame of said vehicle, said straps shaped to conform to the shape of a tire;
   (c) a step bumper attachable to the main frame members of said vehicle by means of extensions extending from the inside of said step bumper, said extensions having first pin apertures for receiving hinge pins;
   (d) a door in the step of said step bumper comprising:
      (i) a rectangular box like structure open at the rear and top, and having side members, a bottom member and a front member;
      (ii) hinge members extending from each of side members and aligned with the inside surface of said extensions, said hinge members having second pin apertures for receiving hinge pins; and
      (iii) hinge pins passed through said first and second pin apertures to rotatably secure said door to said extensions;
   (e) a locking member having a reverse hook for engagement with an opening in a spare tire within said storage compartment, an arcuate section extending over said spare tire and a loop section extending downward toward said cross bar; and
   (f) a chain member attached to said cross bar and attachable to said locking member to secure said locking mechanism is place.

2. The combination of claim 1 additionally comprising a means for latching and securing said door closed in said step bumper.

3. The combination of claim 2 wherein said means for latching and securing comprises a hole in each side member alignable with an internally threaded hole in each adjacent extension and a releasable bolt means extending through said hole and engaged in said internally threaded hole.

4. In combination:
   (a) a vehicle and
   (b) a bumper and tire storage compartment comprising:
      (a) a U shaped cross bar attached to main frame members of said vehicle near the rear of said vehicle;
      (b) at least two straps attached by one end to said cross bar and attached at the other end to a cross member of the frame of said vehicle, said straps shaped to conform to the shape of a tire;
      (c) a step bumper attached to the main frame members of said vehicle by means of extensions extending from the inside of said step bumper, said extensions having first pin apertures for receiving hinge pins;
      (d) a door in the step of said step bumper comprising:
         (i) a rectangular box like structure open at the rear and top, and having side members, a bottom member and a front member;
         (ii) hinge members extending from each of side members and aligned with the inside surface of said extensions, said hinge members having second pin apertures for receiving hinge pins; and
         (iii) hinge pins passed through said first and second pin apertures to rotatably secure said door to said extensions;
      (e) a locking member having a reverse hook for engagement with an opening in a spare tire within said storage compartment, an arcuate section extending over said spare tire and a loop section extending downward toward said cross bar; and
      (f) a chain member attached to said cross bar and attachable to said locking member to secure said locking mechanism is place.

5. The combination of claim 4 additionally comprising a means for latching and securing said door closed in said step bumper.

6. The combination of claim 5 wherein said means for latching and securing comprises a hole in each side member alignable with an internally threaded hole in each adjacent extension and a releasable bolt means extending through said hole and engaged in said internally threaded hole.

7. A combination vehicle bumper and tire storage compartment comprising:
   (a) a rack comprising:
      (i) a U-shaped cross bar attached to main frame members of a vehicle near the rear of said vehicle;
      (ii) at least two straps attached by one end to said cross bar and attached at the other end to a cross frame member of said vehicle, said straps having a shape that conforms to the shape of a tire;
   (b) a step bumper attached to said main frame members of said vehicle by means of a pair of opposed extensions extending from an inside of said step bumper, each of said extensions having first pin apertures for receiving hinge pins;

(c) a closure mounted on said step bumper comprising:
  (i) a rectangular box like structure open at rear and top sides, and having two opposed side members, a bottom member forming a step of said bumper and a front member forming a door which forms a sole access to said rack;
  (ii) a hinge member extending from each of said side members and aligned with an inside surface of said extensions, said hinge members having second pin apertures for receiving said hinge pins; and
  (iii) said hinge pins passed through said first and second pin apertures to rotatably secure said closure to said extension, said closure being arranged for rotation rearward and downward about said hinge pins, said first and second apertures being positioned to allow access to said rack when said closure is rotated downwardly;
(d) means for latching and securing comprising a hole in each said side member aligned with an internally threaded hole in each said adjacent extension and a releasable bolt extending through said hole, engaged in said internally threaded hole and including a portion of said bold positioned in said rectangular box like structure for operating said bolt;
(e) a locking member having a reverse hook for engagement with an opening in a wheel mounted spare tire within said storage compartment, an arcuate section extending over said spare tire and a loop section extending downward toward said cross bar; and
(f) a chain member attached to said cross bar and attachable to said locking member to secure said locking mechanism in place.

* * * * *